United States Patent
Blumenthal

[19]

[11] Patent Number: 5,879,025
[45] Date of Patent: Mar. 9, 1999

[54] INFLATOR FOR AN INFLATABLE VEHICLE OCCUPANT PROTECTION DEVICE

[75] Inventor: Jack L. Blumenthal, Los Angeles, Calif.

[73] Assignee: TRW Vehicle Safety Systems Inc., Lyndhurst, Ohio

[21] Appl. No.: 700,564

[22] Filed: Aug. 8, 1996

[51] Int. Cl.$^6$ .................................................. B60R 21/26
[52] U.S. Cl. .......................................... 280/741; 280/737
[58] Field of Search ................................... 102/530, 531; 280/740, 741, 742, 737, 736

[56] References Cited

U.S. PATENT DOCUMENTS

| | | |
|---|---|---|
| 3,528,372 | 9/1970 | Lewis et al. . |
| 5,031,932 | 7/1991 | Frantom et al. ......................... 280/741 |
| 5,257,817 | 11/1993 | Cuevas . |
| 5,263,740 | 11/1993 | Frey et al. ............................... 280/737 |
| 5,348,344 | 9/1994 | Blumenthal et al. . |
| 5,421,609 | 6/1995 | Moore et al. . |
| 5,429,387 | 7/1995 | Clark et al. . |
| 5,470,104 | 11/1995 | Smith et al. . |
| 5,695,215 | 12/1997 | Headley et al. ......................... 280/741 |

FOREIGN PATENT DOCUMENTS 1386422  3/1975  United Kingdom ................... 280/741

OTHER PUBLICATIONS

W. G. Fassnacht et al., ASM Committee on Flash, Friction and Stud Welding, Friction Welding, Metals Handbook, eighth edition, vol. 6, Welding and Brazing, 1971, pp. 485 and 507–518, American Society for Metals, Metals Park, Ohio 44073.

Primary Examiner—Eric D. Culbreth
Attorney, Agent, or Firm—Tarolli, Sundheim, Covell, Tummino & Szabo

[57] ABSTRACT

A pressure vessel (10) containing fluid (18) under pressure has a first part (38) which is formed of aluminum. An igniter housing (110) comprises a tubular part (112) with a reputable end wall (122) subjected to the pressure of the fluid (18). The tubular part (112) contains an igniter (40) which, when actuated, ruptures the end wall (122). The igniter housing (110) is formed of steel, and is fixed to the first part (38) of the pressure vessel (10) by a friction weld (150). The friction weld (150) blocks the fluid (18) from leaking outward from between the igniter housing (110) and the first part (38) of the pressure vessel (10).

3 Claims, 3 Drawing Sheets

INFLATOR FOR AN INFLATABLE VEHICLE OCCUPANT PROTECTION DEVICE

FIELD OF THE INVENTION

The present invention relates to an inflator, and particularly relates to an inflator for an inflatable vehicle occupant protection device such as an air bag.

BACKGROUND OF THE INVENTION

An inflator for an inflatable vehicle occupant protection device, such as an air bag, may comprise a pressure vessel containing inflation fluid under pressure. Such an inflator is disclosed in U.S. Pat. No. 5,348,344. In the inflator disclosed in the '344 patent, the inflation fluid is an ingredient in a mixture of gases. The mixture of gases further includes a fuel gas which, when ignited, heats the inflation fluid.

The inflator has an igniter containing a small charge of pyrotechnic material. When the air bag is to be inflated, the igniter is actuated electrically. The pyrotechnic material is then ignited and produces combustion products which, in turn, ignite the fuel gas in the pressure vessel.

The fluid pressure inside the pressure vessel is increased by the heat generated upon combustion of the fuel gas. When the increasing fluid pressure reaches a predetermined elevated level, the pressure vessel is opened. The inflation fluid then flows outward from the pressure vessel and into the air bag to inflate the air bag.

SUMMARY OF THE INVENTION

In accordance with the present invention, an inflator comprises a pressure vessel with a storage chamber containing fluid under pressure. The pressure vessel includes a first part which is formed of material comprised at least substantially of aluminum. The pressure vessel further includes an igniter housing structure which is formed of steel.

The igniter housing structure comprises a tubular part with a rupturable end wall subjected to the pressure of the fluid in the storage chamber. The tubular part contains an igniter which, when actuated, ruptures the end wall. A friction weld fixes the igniter housing structure to the first part of the pressure vessel. The friction weld blocks the fluid from leaking outward from the storage chamber between the igniter housing structure and the first part of the pressure vessel.

BRIEF DESCRIPTION OF THE DRAWINGS

Further features of the present invention will become apparent to those skilled in the art to which the present invention relates from reading the following description with reference to the accompanying drawings, in which.

DESCRIPTION OF THE PREFERRED EMBODIMENTS

Figure 1:
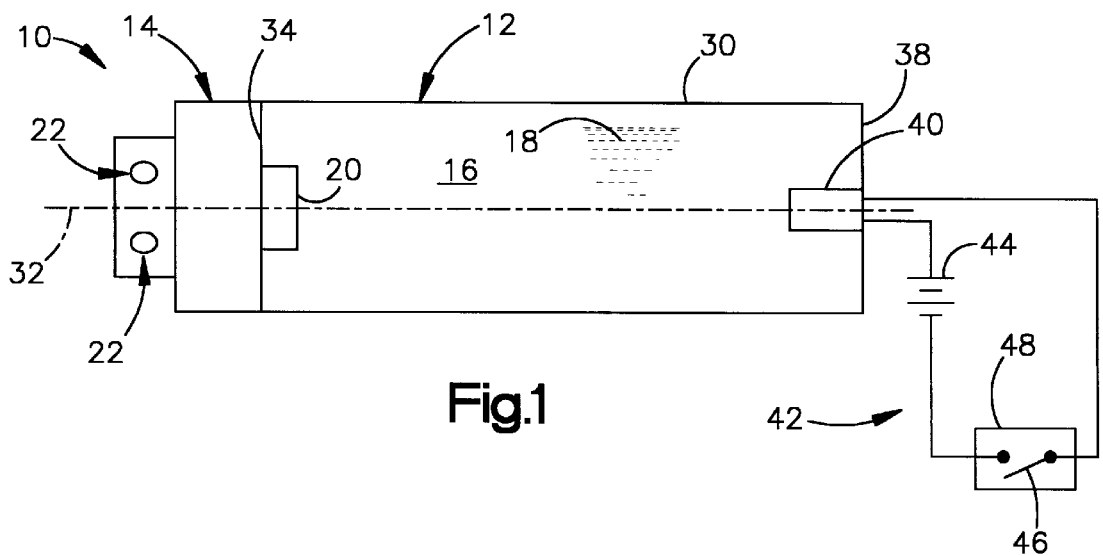
FIG. 1 is a schematic view of a pressure vessel and an electrical circuit comprising a first embodiment of the present invention.

An inflator 10 comprising a first embodiment of the present invention is shown schematically in FIG. 1. The inflator 10 is a pressure vessel including a tank 12, which is sometimes referred to as a bottle, and a closure structure 14 which closes the tank 12. The tank 12 has a storage chamber 16 containing fluid 18 under pressure. In the first embodiment of the present invention, the closure structure 14 is a cap with a rupturable closure wall 20. The closure wall 20 is subjected to the pressure in the storage chamber 16, and blocks the fluid 18 from flowing out of the storage chamber 16. When the pressure vessel 10 is opened, the closure wall 20 is ruptured and the fluid 18 is released to flow out of the storage chamber 16 past the closure wall 20. The fluid 18 then flows outward from the cap 14 through a plurality of outlet openings 22.

As an example of a tank that can be used in accordance with the present invention, the tank 12 shown in the drawings has an elongated cylindrical body wall 30 with a longitudinal central axis 32. An annular outer end surface 34 of the body wall 30 defines a circular open end 36 (FIG. 2) of the tank 12. The body wall 30 has a substantially constant diameter, and extends along the entire length of the tank 12 between a circular end wall 38 and the open end 36. The tank 12 is preferably formed of material comprised at least substantially of aluminum, i.e., aluminum or an aluminum alloy, for low weight and cost. For example, 6061 Alloy is especially suitable for the tank 12.

The fluid 18 contained under pressure in the storage chamber 16 preferably comprises inflation fluid for an inflatable vehicle occupant restraint (not shown) such as an air bag. The inflation fluid preferably comprises combustible fluid. The combustible fluid may have any suitable composition known in the art, but most preferably comprises a combustible mixture of gases including a fuel gas, an oxidizer gas, and an inert gas in accordance with the invention set forth in U.S. Pat. No. 5,348,344, assigned to TRW Vehicle Safety Systems Inc. The combustible mixture of gases 18 is preferably contained in the storage chamber 16 at a storage pressure within the range of approximately 1500 psi to approximately 5000 psi.

The inflator 10 further includes an igniter 40 which functions to ignite the combustible mixture of gases 18 in the storage chamber 16. As shown schematically in FIG. 1, the igniter 40 is located at the end of the tank 12 opposite the cap 14, and is connected in an electrical circuit 42. The electrical circuit 42 includes a power source 44, which is preferably a vehicle battery and/or a capacitor, and a normally open switch 46. The switch 46 is part of a sensor 48 which senses a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the vehicle occupant restraint is desired to help protect an occupant of the vehicle.

When the sensor 48 senses a collision-indicating condition at or above the predetermined threshold level, the switch 46 closes and the igniter 40 is actuated electrically. The igniter 40 then ignites the fuel gas in the mixture of gases 18 in the storage chamber 16. The heat generated by combustion of the fuel gas increases the fluid pressure in the storage chamber 16. When the increasing fluid pressure reaches a predetermined elevated level, it ruptures the closure wall 20. The mixture of gases 18 is thus released to flow outward from the storage chamber 16 through the cap 14, and further outward from the inflator 10 through the outlet openings 22. As described in the '344 patent noted above, the fuel gas is substantially consumed by combustion so that the vehicle occupant restraint is inflated by inflation gas which consists essentially of the inert gas and any remaining oxidizer gas in the mixture of gases 18.

Figure 2:
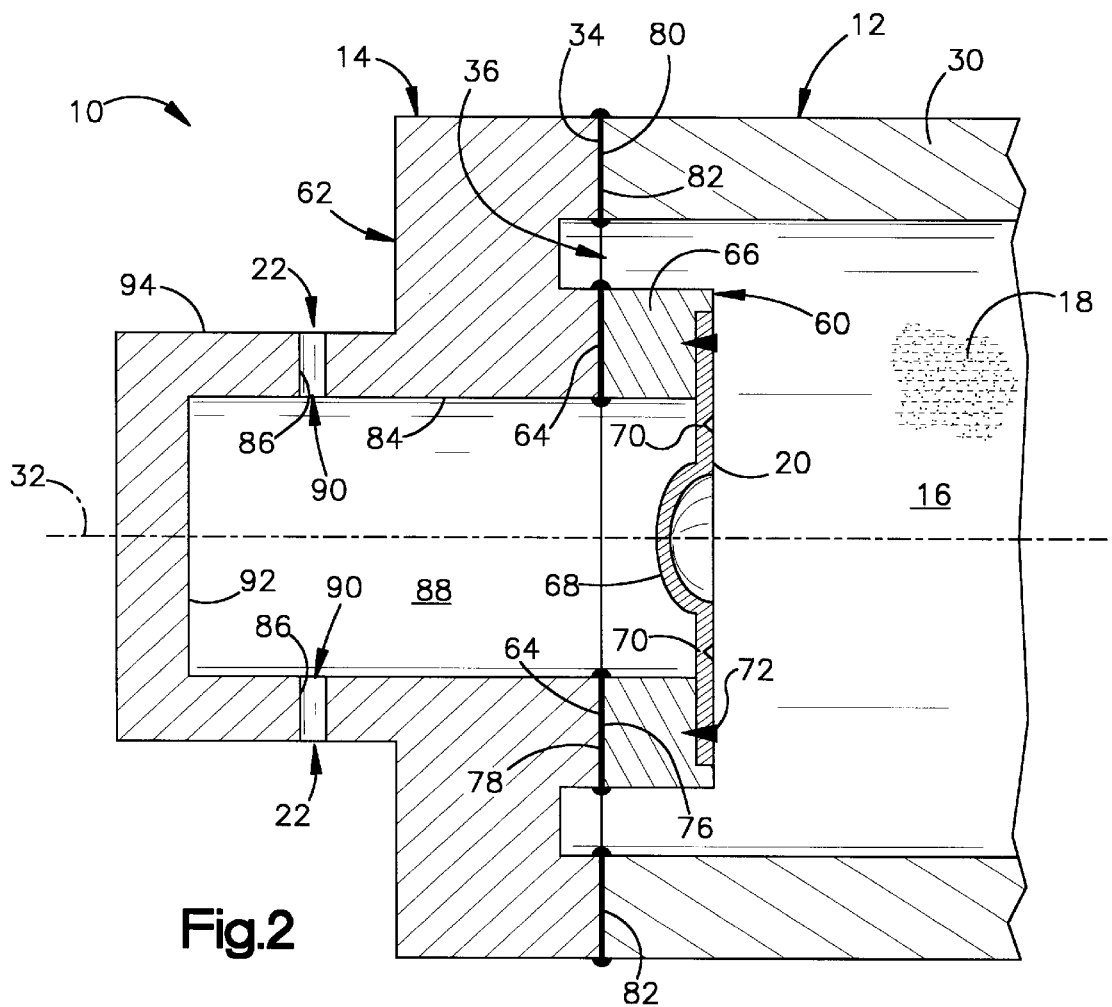
FIG. 2 is a schematic, partial sectional view of parts at one end of the pressure vessel shown in FIG. 1.

As shown in greater detail in FIG. 2, the cap 14 includes inner and outer cap parts 60 and 62. A friction weld 64 fixes and seals the two cap parts 60 and 62 to each other. The friction weld 64 preferably is an inertia weld. However, another type of friction weld, such as a conventional friction weld or a flywheel friction weld, can be used as an alternative.

The inner cap part 60 is defined by interconnected pieces of steel, namely, the closure wall 20 and a support ring 66. The closure wall 20 may have any suitable structure known in the art. As an example of a closure wall that can be used in accordance with the present invention, the closure wall 20 in the first embodiment is a burst disk with a central portion 68 surrounded by an annular portion 70. The annular portion 70 of the closure all 20 is constructed with a stress riser which is rupturable under the influence of a predetermined elevated fluid pressure acting outward against the closure wall 20 from the storage chamber 16. The central portion 68 of the closure wall 20 is thus constructed as a predefined breakaway part, and becomes severed from the annular portion 70 when the fluid pressure in the storage chamber 16 reaches the predetermined elevated level as a result of combustion of the fuel gas in the mixture of gases 18. Such a burst disk is known in the art. A circumferentially extending weld 72 fixes and seals the burst disk 20 and the support ring 66 concentrically together. Preferred materials for the burst disk 20 and the support ring 66 include Type 304L and Type 316L stainless steel.

The outer cap part 62 is preferably constructed as a single continuous body of material comprised at least substantially of aluminum, with 6061 Alloy being most preferable. A first annular inner surface 76 of the outer cap part 62 is centered on the axis 32, and abuts a coextensive annular outer end surface 78 of the support ring 66. The inertia weld 64 joins the inner end surface 76 to the outer end surface 78.

When the inner and outer cap parts 60 and 62 have been interconnected by the inertia weld 64, the cap 14 is mounted on the body wall 30 of the tank 12 to close the open end 36 of the tank 12. Specifically, a second annular inner end surface 80 of the outer cap part 62 is moved into abutment with the annular outer end surface 34 of the body wall 30. Another friction weld 82, which also is preferably an inertia weld, is then formed to join the abutting surfaces 80 and 34 together. The cap 14 and the tank 12 are thus fixed and sealed to each other circumferentially entirely around the axis 32.

The second cap part 62 further has a major cylindrical inner surface 84 and a plurality of minor cylindrical inner surfaces 86. The cylindrical inner surfaces 84 and 86 respectively define an outlet conduit 88 and a plurality of outlet passages 90. The conduit 88 extends axially from the annular surface 76 to a circular inner surface 92. The passages 90 extend radially from the conduit 88 to the outlet openings 22. Preferably, the inner surfaces 84, 86, and 92 of the outer cap part 62 are anodized for increased resistance to oxidation under the influence of the heat generated by combustion of the combustible mixture of gases 18. A cylindrical outer surface 94 of the outer cap part 62 also may be anodized for increased resistance to oxidation around the outlet openings 22.

The cap 14 may also have an inlet structure (not shown) for filling the tank 12 with the mixture of gases 18. Such an inlet structure is known in the art. When the tank 12 has been filled with the mixture of gases 18, the fluid pressure in the storage chamber 16 acts axially outward against the cap 14, i.e., in a direction extending from right to left in FIG. 2. This induces stress in the inertia welds 64 and 82. The stress induced in the inertia weld 82 consists essentially of tensile and shear stress. The similar materials (aluminum or aluminum alloys) of the tank 12 and the outer cap part 62 help to ensure that the inertia weld 82 will be strong enough to withstand such stress. On the other hand, the stress induced in the inertia weld 64 consists essentially of compressive stress. The dissimilar materials of the inner and outer cap parts 60 and 62 (steel and aluminum or aluminum alloys) are securely fixed and sealed to each other by the inertia weld 64 in this condition.

Figure 3:
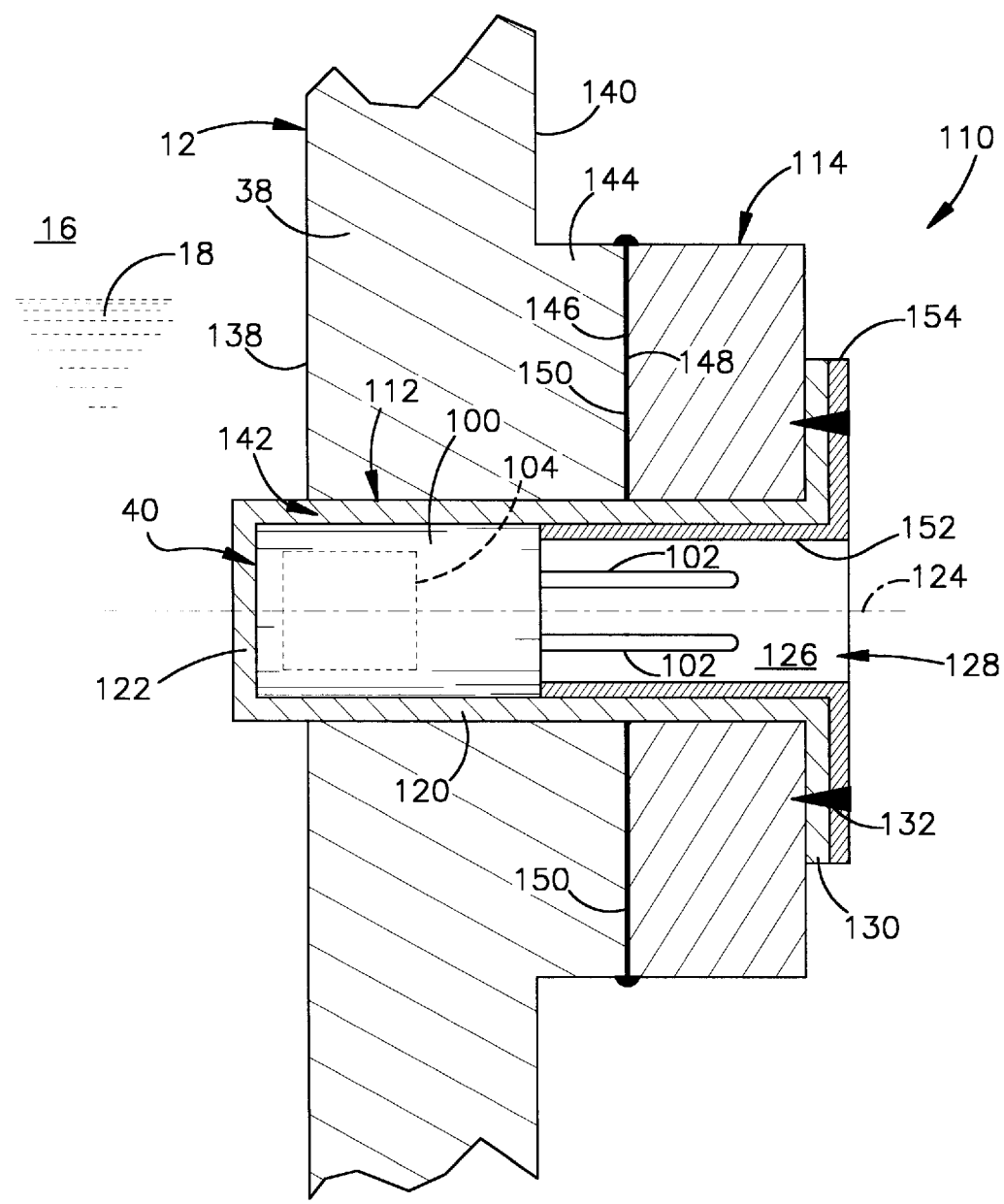
FIG. 3 is a schematic, partial sectional view of parts at an opposite end of the pressure vessel shown in FIG. 1.

As shown in FIG. 3, the igniter 40 in the first embodiment of the present invention is a conventional squib with a cylindrical casing 100 and a pair of axially projecting electrodes 102. The casing 100 contains a small charge 104 of pyrotechnic material which may have any suitable composition known in the art. The charge 104 of pyrotechnic material is ignited in a known manner upon the passage of electric current through the igniter 40 between the electrodes 102.

The igniter 40 is contained in an igniter housing 110 which includes a tubular part 112 and a support ring 114. Both the tubular part 112 and the support ring 114 are preferably formed of steel, and are most preferably formed of Type 304L or Type 316L stainless steel.

The tubular part 112 of the igniter housing 110 has an elongated cylindrical body wall 120 and a circular inner end wall 122, each of which is centered on a longitudinal central axis 124 which is parallel to the axis 32 (FIG. 2). The inner end wall 122 thus faces inward of the storage chamber 16 toward the closure wall 20 at the opposite end of the tank 12. The tubular part 112 defines a cylindrical chamber 126 extending axially between the inner end wall 122 and an open outer end 128 of the body wall 120. A ring-shaped flange 130 on the tubular part 112 projects radially outward from the body wall 120 at the open outer end 128.

The support ring 114 closely surrounds the body wall 120 of the tubular part 112, and abuts the flange 130 on the tubular part 112. A circumferentially extending weld 132 fixes and seals the support ring 114 and the tubular part 112 together where the support ring 114 abuts the flange 130.

The end wall 38 of the tank 12 has an inner side 138 and an outer side 140. The body wall 120 of the tubular part 112 extends closely through a cylindrical passage 142 in the end wall 38 of the tank 12, and preferably projects a short distance into the storage chamber 16. The inner end wall 122 of the tubular part 112 is thus subjected to the fluid pressure in the storage chamber 16.

The support ring 114 abuts a short annular projection 144 at the outer side 140 of the end wall 38. Specifically, an annular inner surface 146 of the support ring 114 abuts an annular outer surface 148 of the projection 144. A friction weld 150 joins the annular inner surface 146 to the annular outer surface 148. Like the friction welds 64 and 82 described above, the friction weld 150 preferably is an inertia weld. In this configuration, the friction weld 150 fixes and seals the igniter housing 110 to the end wall 38 so as to block the combustible mixture of gases 18 from leaking outward from the storage chamber 16 between the igniter housing 110 and the end wall 38.

The igniter 40 is contained within the chamber 126 in the tubular part 112. The casing 100 adjoins, or may be spaced a short distance from, the inner end wall 122 of the tubular part 112. A retainer tube 152 is received through the open outer end 128 of the body wall 120. The retainer tube 152 fits closely within the body wall 120 to hold the casing 100 in the chamber 126. A ring-shaped flange 154 on the retainer tube 152 abuts the flange 130 on the tubular part 112, and is fixed to the flange 130 by the weld 132. The electrodes 102 are accessible through the open end 128 of the body wall 120 for connection in the electrical circuit 42 of FIG. 1.

When the switch 46 in the electrical circuit 42 closes, electric current is directed through the igniter 40 between the electrodes 102. The charge 104 of pyrotechnic material is then ignited and produces combustion products which rupture the inner end wall 122 and move into the storage chamber 16 to ignite the fuel gas in the combustible mixture of gases 18.

Figure 4:
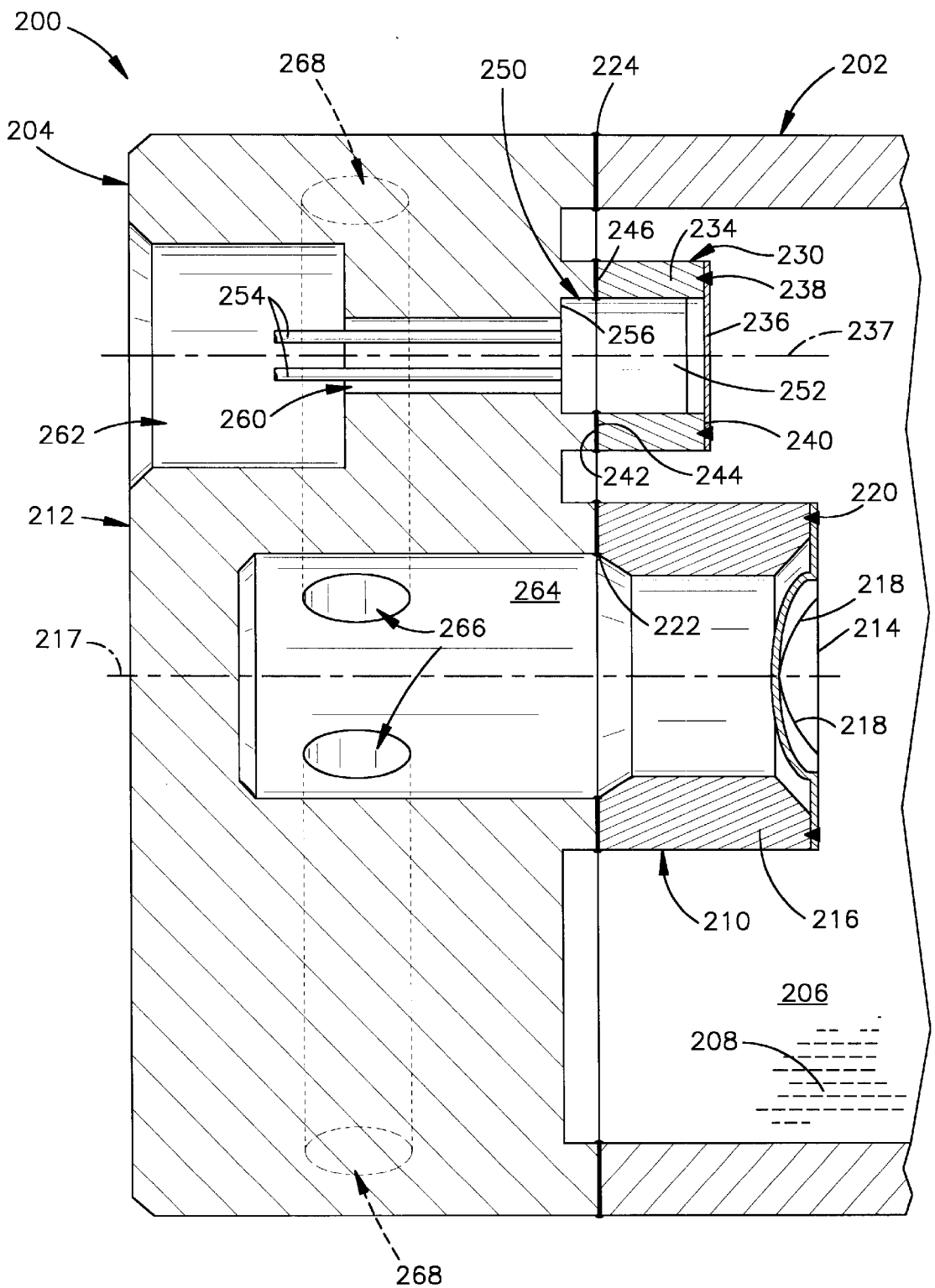
FIG. 4 is a view similar to FIG. 2 showing parts of a pressure vessel comprising a second embodiment of the present invention.

An inflator 200 comprising a second embodiment of the present invention is shown partially in FIG. 4. Like the inflator 10 described above, the inflator 200 is a pressure vessel including a tank 202 and a closure structure 204. The tank 202 is formed of material comprised at least substantially of aluminum, i.e., aluminum or an aluminum alloy, with 6061 Alloy being most preferably. A storage chamber 206 in the tank 202 contains fluid 208 at a storage pressure which is preferably within the range of approximately 1,500 psi to approximately 5,000 psi. The fluid 208 preferably comprises inflation fluid for an inflatable vehicle occupant restraint, and most preferably comprises a combustible mixture of gases in accordance with the invention set forth in U.S. Pat. No. 5,348,344.

The closure structure 204 is a cap with inner and outer parts 210 and 212. The inner part 210 of the cap 204 includes a rupturable closure wall in the form of a stainless steel burst disk 214, and further includes a stainless steel support ring 216. The burst disk 214 faces inward of the storage chamber 206 along an axis 217, and has a plurality of radially extending score lines 218. A circumferentially extending weld 220 fixes and seals the burst disk 214 to the support ring 216. A first friction weld 222 fixes and seals the support ring 216 to the outer part 212 of the cap 204. The outer part 212 of the cap 204 also is formed of material comprised at least substantially of aluminum, and is most preferably formed of the same material as the tank 202. A second friction weld 224 fixes and seals the outer part 212 of the cap 204 to the tank 202.

An igniter housing 230 is mounted on the outer part 212 of the cap 204. The igniter housing 230 includes a tubular part 234 with a rupturable end wall defined by a burst disk 236. Both the tubular part 234 and the burst disk 236 are formed of stainless steel.

The burst disk 236 is centered on an axis 237 which is parallel to the central axis 217. The burst disk 236 thus faces inward of the storage chamber 206 at a location spaced radially from the burst disk 214. A weld 238 fixes and seals the burst disk 236 to the tubular part 234 at an annular surface 240 at one end of the tubular part 234. An annular surface 242 at an opposite end of the tubular part 234 abuts a raised annular surface 244 on the outer cap part 212. A third friction weld 246 fixes and seals the tubular part 234 to the outer cap part 212 at the abutting surfaces 242 and 244. Like the friction welds described above, the first, second and third friction welds 222, 224 and 246 in the second embodiment of the present invention are preferably inertia welds.

The inflator 200 further includes an igniter 250 with a cylindrical casing 252 and a pair of electrical lead wires 254. The casing 252 is retained within the tubular part 234 of the igniter housing 230 axially between the burst disk 236 and an annular shoulder surface 256 on the outer cap part 212. The lead wires 254 project axially outward from the casing 252 through a narrow cylindrical passage 260 in the outer cap part 212, and are accessible in wider cylindrical cavity 262 in the outer cap part 212.

The igniter 250 is connected in an electrical circuit (not shown) like the circuit 42 shown in FIG. 1. When the igniter 250 is actuated, it emits combustion products which rupture the burst disk 236 and move into the storage chamber 206 to ignite the fuel gas in the combustible mixture of gases 208. The other burst disk 214 subsequently ruptures under stress induced by the elevated fluid pressure attained in the storage chamber 206 upon combustion of the fuel gas. The inflation gas is thus released to flow outward through an outlet conduit 264, a plurality of outlet passages 266, and a corresponding plurality of outlet openings 268 in the outer part 212 of the cap 204. As in the first embodiment of the present invention described above, the corresponding surfaces of the outer cap part 212 in the second embodiment may be anodized for increased resistance to oxidation under the influence of the heat generated by combustion of the combustible mixture of gases 208.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a pressure vessel having a storage chamber containing fluid under pressure, said pressure vessel including a tank wall formed of material comprised at least substantially of aluminum;

said pressure vessel further including an igniter housing structure comprising a tubular part which extends into said storage chamber through a passage in said tank wall and which has a rupturable end wall subjected to said pressure, said tubular part containing an igniter which, when actuated, ruptures said end wall;

said igniter housing structure being formed of steel and being fixed to said tank wall by a friction weld which blocks said fluid from leaking outward from said storage chamber between said igniter housing structure and said tank wall;

said igniter housing structure further comprising a steel ring encircling said tubular part, said ring and said tank wall having abutting surfaces which are joined to each other by said friction weld.

2. Apparatus comprising:

a pressure vessel having a storage chamber containing fluid under pressure, said pressure vessel including a first part formed of material comprised at least substantially of aluminum;

said pressure vessel further including an igniter housing structure comprising a tubular part with a rupturable end wall subjected to said pressure, said tubular part containing an igniter which, when actuated, ruptures said end wall;

said igniter housing structure being formed of steel and being fixed to said first part by a friction weld which blocks said fluid from leaking outward from said storage chamber between said igniter housing structure and said first part;

said pressure vessel comprising a tank and a closure structure closing said tank, said closure structure including said first part of said pressure vessel;

said first part of said pressure vessel defining a plurality of fluid outlet openings and supporting a closure wall which is rupturable under the influence of fluid pressure at a predetermined elevated level;

said closure wall facing inward of said storage chamber along an axis, said rupturable end wall of said tubular part facing inward of said storage chamber at a location spaced radially from said closure wall.

3. Apparatus comprising:

a tank containing fluid under pressure, said tank comprising a first part formed of material comprised at least substantially of aluminum;

a tank closure structure comprising a second part formed of material comprised at least substantially of aluminum, said second part supporting a closure wall which is rupturable under the influence of said pressure when said pressure reaches a predetermined elevated level;

ignitable material which, when ignited, heats said fluid to increase said pressure; and an igniter housing structure comprising a tubular part with a rupturable end wall subjected to said pressure, said tubular part containing an igniter which, when actuated, ruptures said end wall and ignites said ignitable material;

said igniter housing structure being formed of steel and being fixed to one of said parts by a friction weld which blocks said fluid from leaking outward from said tank between said igniter housing structure and said one of said parts;

said igniter housing structure further comprising a steel ring encircling said tubular part, said ring and said one of said parts having abutting surfaces which are joined to each other by said friction weld.

* * * * *